July 24, 1934.  O. BARNACK  1,967,279
PHOTOGRAPHIC CAMERA
Filed July 13, 1932
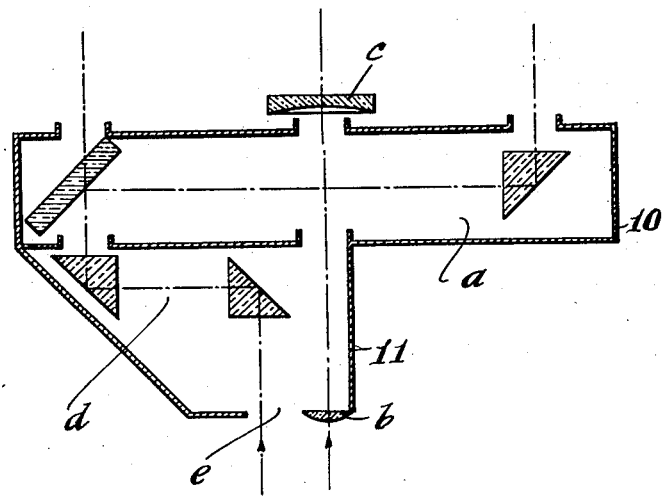
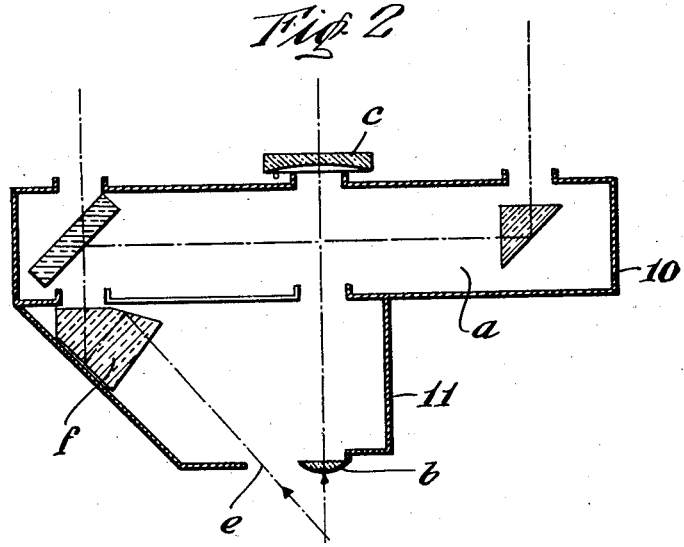
INVENTOR
Oskar Barnack
BY
ATTORNEY Patented July 24, 1934

1,967,279

UNITED STATES PATENT OFFICE 1,967,279

PHOTOGRAPHIC CAMERA

Oskar Barnack, Wetzlar, Germany, assignor to Ernst Leitz, Optische Werke, G. m. b. H., Wetzlar, Germany Application July 13, 1932, Serial No. 622,19*
In Germany January 30, 1932

2 Claims. (Cl. 88—2.6)

This invention relates to improvements in distance meters for photographic cameras with a view finder combined therewith, and it is the principal object of my invention to provide an instrument in which the optical axes of both instruments are separated from one another, while the sight openings are so closely arranged, that a simple movement of the eyes is sufficient to observe both openings successively, thus avoiding the necessity of moving the head or adjusting the distance meter or view finder.

When making photographic pictures in a hurry it is frequently troublesome to first measure the distance and then to attempt to find the view by a lateral movement of the head or lateral displacement of the camera. It will be evident that a device which requires simply a slight movement of the eyeball in order to enable to survey in quick succession the sight openings, must be considered a vital and useful step forward in the art of great importance.

These and other objects and advantages of my invention will become more fully apparent as the description thereof proceeds, and will then be specifically defined in the appended claims.

In the accompanying drawing forming a material part of this disclosure:

Fig. 1 is a diagrammatic view of a distance meter and view finder constructed according to my invention.

Fig. 2 is a modified form of the invention.

As illustrated the box 10 of a mirror distance meter $a$ is combined with an extension 11 for a view finder $b$ and $c$. In front of the rear sight openings of a distance meter either rectangular prisms $d$ (Fig. 1) in the extension 11 or an obliquely reflecting prism $f$ (Fig. 2) also in the extension 11 are so arranged that the light rays from the distance meter are guided into a sight opening $e$ which is closely arranged to the sight opening of the view finder.

It is evidently also possible with the same good result to guide by means of suitable prism systems the light rays from the sight opening of the view finder close to the sight opening of the distance meter.

In use, it will be possible to observe both sight openings of distance meter and view finder successively by a single turn of the eyeball without the necessity of turning the head to observe the picture range after measuring the distance.

It will be understood that I have described the preferred forms of my invention only as examples of the many possible ways to practically construct my invention and that I may make such changes as come within the scope of the appended claims in my device, without departure from the spirit of my invention and the principles involved.

Having thus described my invention, what I claim as new and desire to secure by Letters Patent is:

1. A combined distance meter in its casing and view finder for photographic cameras in an extension of the casing comprising two prisms in said extension to refract the light rays from the distance meter into a sight opening in close lateral relation to the sight opening of the view finder.

2. A combined distance meter and view finder for photographic cameras comprising a reflecting rectangular prism in front of the rear sight opening of the distance meter and another rectangular prism laterally disposed to said first named prism for reflecting the light rays from the distance meter into a sight opening in close proximity of the view finder.

OSKAR BARNACK.